(12) United States Patent
Nagai et al.

(10) Patent No.: US 11,180,056 B2
(45) Date of Patent: Nov. 23, 2021

(54) VEHICLE-MOUNTED SEAT DEVICE

(71) Applicant: Toyota Jidosha Kabushiki Kaisha, Toyota (JP)

(72) Inventors: Tetsuya Nagai, Okazaki (JP); Kohshi Katoh, Toyota (JP); Takashi Sugimoto, Anjyo (JP); Osamu Oda, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/010,367

(22) Filed: Sep. 2, 2020

(65) Prior Publication Data

US 2021/0061140 A1 Mar. 4, 2021

(30) Foreign Application Priority Data

Sep. 4, 2019 (JP) .............................. JP2019-161188

(51) Int. Cl.

| | |
|---|---|
| *B60N 2/806* | (2018.01) |
| *B60N 2/20* | (2006.01) |
| *B60N 2/39* | (2006.01) |
| *B60N 2/005* | (2006.01) |
| *B60N 2/06* | (2006.01) |
| *B60N 2/42* | (2006.01) |
| *B60N 2/64* | (2006.01) |
| *B60N 2/68* | (2006.01) |
| *B60N 2/803* | (2018.01) |
| *B60N 2/894* | (2018.01) |
| *B60N 2/50* | (2006.01) |

(52) U.S. Cl.
CPC ............... *B60N 2/20* (2013.01); *B60N 2/005* (2013.01); *B60N 2/06* (2013.01); *B60N 2/39* (2013.01); *B60N 2/42* (2013.01); *B60N 2/503* (2013.01); *B60N 2/643* (2013.01); *B60N 2/686* (2013.01); *B60N 2/803* (2018.02); *B60N 2/894* (2018.02); *B60N 2205/30* (2013.01)

(58) Field of Classification Search
CPC .......... B60N 2/20; B60N 2/894; B60N 2/803; B60N 2/005; B60N 2/06; B60N 2/39; B60N 2/42; B60N 2/503; B60N 2/643; B60N 2/686; B60N 2205/30
See application file for complete search history.

(56) References Cited

FOREIGN PATENT DOCUMENTS

| | | |
|---|---|---|
| JP | 2012-096773 A | 5/2012 |
| JP | 2018-043672 A | 3/2018 |

*Primary Examiner* — Philip F Gabler
(74) *Attorney, Agent, or Firm* — Dinsmore & Shohl LLP

(57) ABSTRACT

A vehicle-mounted seat device includes an SB main frame, a backrest, a relay disk secured at the center in the width direction of the backrest, a plurality of radial wires for suspending the backrest such that the backrest can swing relative to the SB main frame with the relay disk as the center, an SB subframe capable of swinging together with the backrest, a headrest, a headrest stay extending downward from the headrest and mounted on the SB main frame so as to rotate around a rotation shaft; a pressure-receiving body secured on the headrest stay so as to be disposed behind and opposed to the relay disk; and a provisional connection mechanism for provisionally connecting the headrest stay to the SB main frame.

4 Claims, 15 Drawing Sheets

VEHICLE-MOUNTED SEAT DEVICE

CROSS REFERENCE TO RELATED APPLICATION

This application claims priority to Japanese Patent Application No. 2019-161188 filed on Sep. 4, 2019, which is incorporated herein by reference in its entirety including the specification, claims, drawings, and abstract.

TECHNICAL FIELD

This specification discloses a seat device to be mounted in a vehicle.

BACKGROUND

A vehicle-mounted seat device typically includes a seat cushion for supporting the hips of an occupant seated on the vehicle-mounted seat device (hereinafter referred to as a "seated person") and a seatback for supporting the back of the seated person. The seatback further includes a backrest on which the seated person is to lean, and a frame for supporting the backrest. JP 2018-43672A discloses a vehicle-mounted seat device including a backrest that can swing in the right-left direction. The frame disclosed in JP 2018-43672A 1 includes a seatback frame and a subframe. The subframe is connected to the seatback frame via a leaf spring so as to swing relative to the seatback frame. The subframe has a net structure including a plurality of radially spreading linear members. The backrest is disposed forward of the net structure. With this structure, the tensile force of the linear members can provide appropriate cushioning, and the backrest can swing together with the subframe relative to the seatback frame.

Note here that, at the time of rear collision of a vehicle, a seated person may suffer cervical sprain, or so-called whiplash. Whiplash is caused by an impact at the time of rear collision that pushes the body of a seated person forward of the vehicle together with the backrest while his/her head remains as it is. Consequently, the head is caused to swing far rearward relative to the body, which damages the cervical tissues. Whiplash may likely become serious, in particular, with a seat device including a backrest supported by linear members, as is in JP 2018-43672A. That is, in the case of a seat device including a thick cushion member (for example, urethane mats), the body of a seated person sinks far rearward while greatly deforming the cushion member upon receipt of an impact at the time of rear collision. This results in a smaller difference in the amount of retreatment between the body and the head. In contrast, in the case of a seat device disclosed in JP 2018-43672A in which cushioning properties are ensured by the tensile force of the linear members supporting the backrest, the body of the seated person tends to sink only by a small amount upon receipt of an impact at the time of rear collision, which likely causes the head to swing far rearward, as compared with the body.

In view of the above, conventionally, a headrest has been provided to a vehicle-mounted seat device to prevent occurrence of or reduce the damage of whiplash. A headrest is effective in preventing the head of a seated person from swinging at the time of rear collision of a vehicle and preventing occurrence of whiplash. Some such headrests incorporate an active headrest mechanism that causes the headrest to lean forward at the time of collision to thereby improve protection capability. For example, JP 2012-96773A discloses a headrest including such an active headrest mechanism. A conventional active headrest mechanism, however, is incorporated in a vehicle-mounted seat device whose backrest swings in neither the right nor left direction, and can be hardly adapted to swingable backrests. Although the vehicle-mounted seat device disclosed in JP 2018-43672A includes a headrest for supporting the head of a seated person, JP 2018-43672A does not elaborate the detailed structure of the headrest.

In view of the above, this specification discloses a vehicle-mounted seat device including a swingable backrest and capable of more reliable protection of a seated person at the time of rear collision.

SUMMARY

A vehicle-mounted seat device disclosed in this specification includes a seatback main frame standing in a vehicle cabin; a backrest on which the back of a seated person is to lean; a relay disk secured at the center in the width direction of the backrest; a plurality of suspension tools spreading radially from the relay disk as the center, the suspension tools being for suspending the backrest such that the backrest is able to swing relative to the seatback main frame with the relay disk as the center; a seatback subframe mounted on the backrest, the seatback subframe being capable of swinging together with the backrest relative to the seatback main frame; a headrest provided above the backrest, the headrest for supporting the head of the seated person; a headrest stay connected to the headrest and extending downward from the headrest; a rotation shaft extending in the right-left direction, the rotation shaft for supporting the middle portion of the headrest stay such that the headrest stay is able to rotate relative to the seatback main frame; a pressure-receiving body secured on a lower portion of the headrest stay and disposed behind and opposed to the relay disk; and a provisional connection mechanism for connecting the headrest stay to the seatback main frame to regulate the rotation of the headrest stay and for releasing the connection between the headrest stay and the seatback main frame upon input of a force greater than a predetermined force in a direction in which the headrest stay leans forward.

As the backrest swings with the relay disk as the center, even when the backrest should swing around the front-back axis and thereby be inclined, the position of the relay disk in the right-left and up-down directions remains unchanged. With the pressure-receiving body provided behind this relay disk, even if the backrest should be inclined at the time of rear collision, the relay disk moves rearward together with the backrest, and the relay disk reliably collides against the pressure-receiving body. This causes the headrest stay to swing to lean forward with the rotation axis as the center, which enables reliable support of the head of a seated person. Consequently, the above-described structure enables more reliable protection of a seated person at the time of rear collision, while having a swingable backrest.

In this case, the provisional connection mechanism may connect the headrest stay to the seatback main frame by any of magnetic force, friction force, and a member that is breakable upon input of a force greater than a predetermined force.

With this structure, as a force greater than a predetermined force is inputted, it is possible to reliably cause the headrest stay to lean forward.

The seatback main frame may have a stay hole that is a through hole into which the headrest stay is to be inserted and that is larger than the headrest stay.

In this case, when being inclined by an amount greater than a predetermined amount, the headrest stay abuts the circumferential edge of the stay hole to thereby prevent further inclination. That is, with provision of a stay hole into which the headrest stay is to be inserted, it is possible to regulate the amount of inclination of the headrest stay.

The pressure-receiving body may be a plate equal to or larger in size than the relay disk, and the pressure-receiving body may have a recess formed on a surface thereof opposed to the relay disk, the recess for avoiding interference with the suspension tool extending from the relay disk.

As this structure can prevent interference between the suspension tool and the pressure-receiving body, it is possible to have the suspension tool strung in a more appropriate condition.

The vehicle-mounted seat device disclosed in this specification enables more reliable protection of a seated person at the time of rear collision, while having a swingable backrest.

BRIEF DESCRIPTION OF DRAWINGS

Embodiment(s) of the present disclosure will be described based on the following figures, wherein.

DESCRIPTION OF EMBODIMENTS

Figure 1:
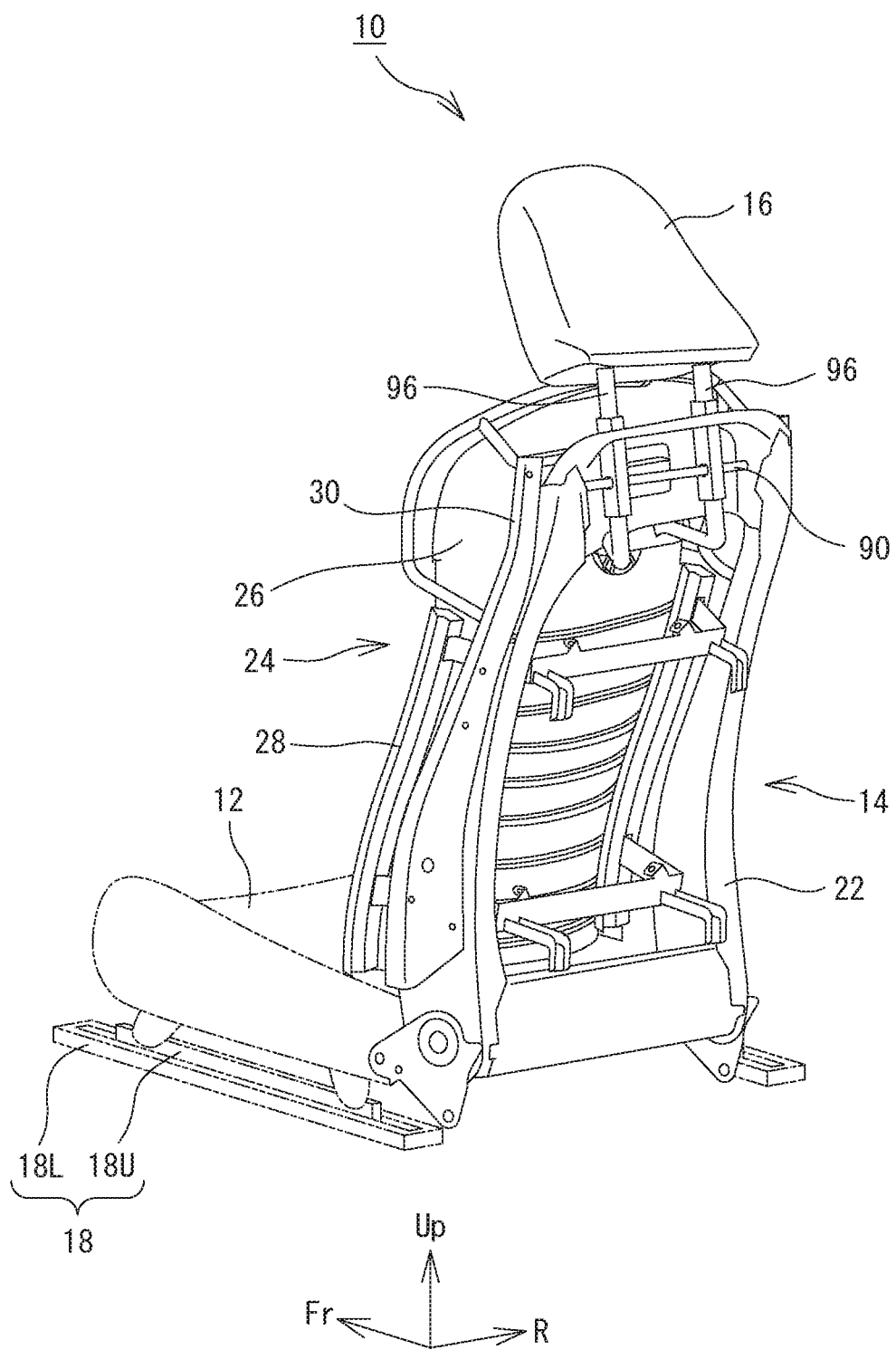
FIG. 1 is a perspective view of a vehicle-mounted seat device viewed from diagonally rearward.
Figure 2:
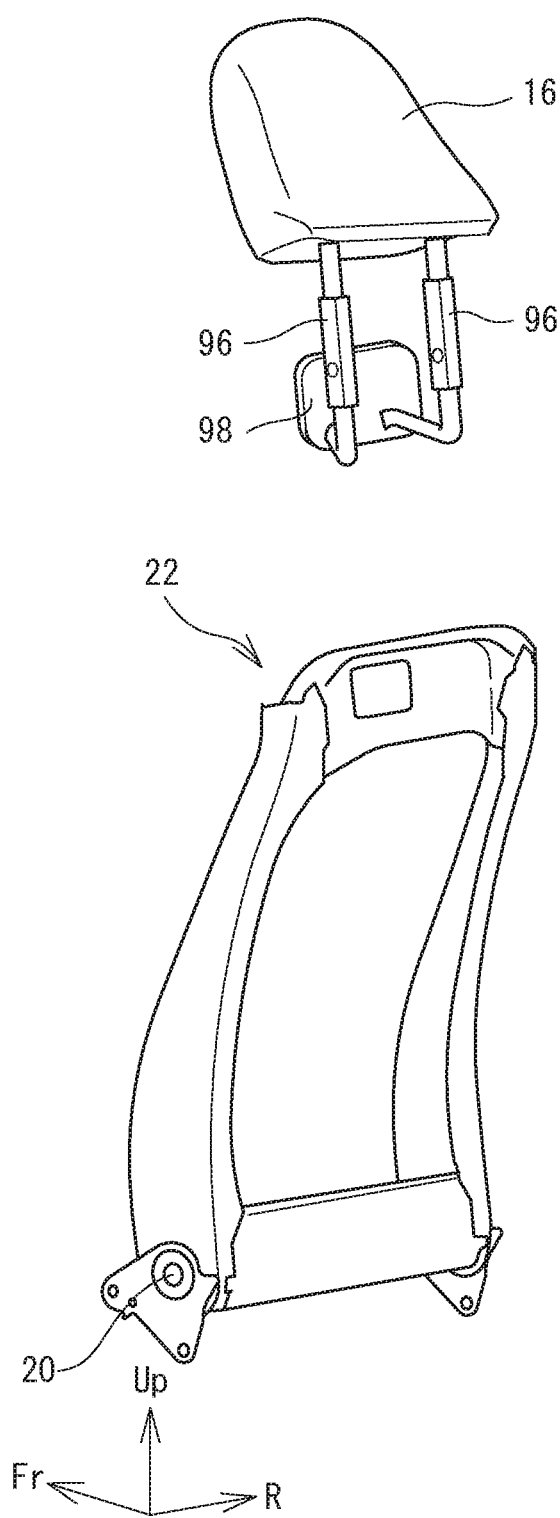
FIG. 2 is an exploded perspective view of an SB main frame and a headrest.
Figure 3:
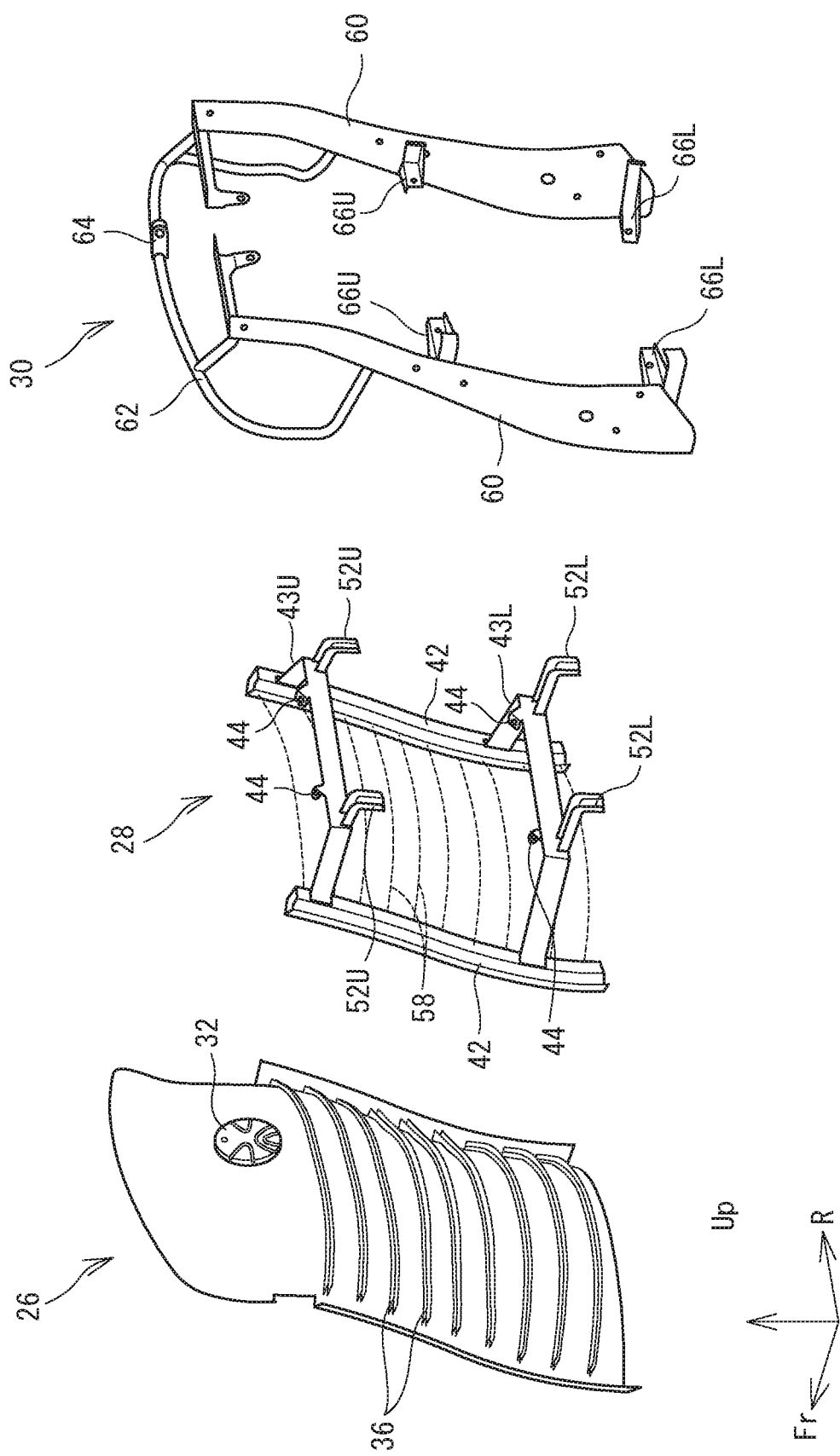
FIG. 3 is an exploded perspective view of an SB assembly.

The structure of a vehicle-mounted seat device 10 will now be described while referring to the following drawings. FIG. 1 is a perspective view of the vehicle-mounted seat device 10 viewed from diagonally rearward. FIG. 2 and FIG. 3 are exploded perspective views of a seatback 14. Note that terms such as "up/down", "front/back", and "right/left" in the following description refer to respective directions as viewed by an occupant seated on the vehicle-mounted seat device 10 (hereinafter referred to as a "seated person") unless otherwise stated. In respective drawings, "Fr", "Up", and "R" respectively refer to forward, upward, and rightward directions. A "seatback" may be hereinafter abbreviated as "SB" when necessary.

The vehicle-mounted seat device 10 is to be mounted in a vehicle, and is to be used, for example, as a front seat, such as a driver's seat or a passenger seat. The vehicle-mounted seat device 10 includes as main components a seat cushion 12 that supports the hips of a seated person, the seatback 14 that supports the back of the seated person, and a headrest 16 that supports the head of the seated person. In view that a known conventional technique can be referred to as to the structure of the seat cushion 12, the structure of the seat cushion 12 is not described in detail. In FIG. 1, the shape of the seat cushion 12 is only roughly illustrated. On the floor surface inside the cabin of the vehicle, a slide rail 18 is installed. The slide rail 18 includes a lower rail 18L secured on the floor surface of the cabin and extending in the front-back direction, and an upper rail 18U slidable along the lower rail 18L. The seat cushion 12 is connected to the upper rail 18U at its four corners, which makes the vehicle-mounted seat device 10 slidable in the front-back direction.

The headrest 16 is a member provided above the seatback 14 to support the head of a seated person. From the lower edge of the headrest 16, a pair of headrest stays 96 extend. The headrest stays 96 are rotatably mounted on an SB main frame 22, as described later.

The seatback 14 includes as main components the SB main frame 22 and an SB assembly 24. The SB main frame 22 is a frame member standing in the cabin and made of highly rigid metal material (for example, steel). As illustrated in FIG. 2, the SB main frame 22 includes four connected upper, lower, right, and left fame members that together define a substantially rectangular shape when viewed from the front. Near the lower end of the SB main frame 22, a reclining shaft 20 is provided extending in the right-left direction. The SB main frame 22 is swingably connected to the seat cushion 12 via the reclining shaft 20. Specifically, the SB main frame 22 swings around the reclining shaft 20 as the center, whereby the entire seatback 14 can swing (that is, recline) relative to the seat cushion 12.

FIG. 3 is an exploded perspective view of the SB assembly 24. The SB assembly 24 is formed by combining a backrest 26, an SB subframe 28, and an SB middle frame 30. The SB middle frame 30 is a frame member secured on the SB main frame 22, and is not movable in position relative to the SB main frame 22. The backrest 26 is a thin panel member on which the back of a seated person is to lean. The backrest 26 is held suspended from the SB middle frame 30, and can swing relative to the SB middle frame 30 and thus the SB main frame 22. The SB subframe 28 is provided behind the backrest 26, and can swing together with the backrest 26 relative to the SB middle frame 30 and thus the SB main frame 22.

More specifically, the SB middle frame 30 includes a pair of side frames 60 extending in the up-down direction, and a support pipe 62 extending between the pair of side frames 60. Each side frame 60 is placed on the outer surface of the SB main frame 22 and fastened to the SB main frame 22 with bolts. Near the lower end of the side frame 60 and the middle of the side frame 60 in the height direction, upper front restraining brackets 66U and lower front restraining brackets 66L (hereinafter to be referred to as "front restraining brackets 66" when discrimination between upper and lower ones is not made) are secured such as by welding. The front restraining bracket 66 is a bracket to which the front end portion of a front-back wire 82, to be described later, is secured. A specific structure of the front restraining bracket 66 will be described later.

The backrest 26 is a member for supporting the back of a seated person, and is curved in accordance with the shape of the back of a person. On the back surface of the backrest 26 at the center in the right-left direction, a relay disk 32 is secured. The relay disk 32 is positioned higher than the center of the backrest 26 in the height direction and substantially as high as the shoulder blades of a seated person. The relay disk 32 is a low-profile disk member whose diameter is sufficiently larger than its size in its axial direction. On the surface of the relay disk 32, there are formed grooves or slits in which radial wires 74, to be described later, are to be hooked. On the rear surface of the backrest 26 below the relay disk 32, a plurality of wire guides 36 are disposed at intervals in the up-down direction. Each wire guide 36 indicates a position where to dispose a lateral wire 58 to be described later, and includes ribs standing from the rear surface of the backrest 26.

The SB subframe 28 is a frame member mounted on the rear surface of the backrest 26. The SB subframe 28 includes a pair of vertical frames 42, an upper lateral frame 43U, and a lower lateral frame 43L (hereinafter referred to as "lateral frames 43" when discrimination between upper and lower ones is not made), and a plurality of the lateral wires 58. The vertical frames 42 are frame members extending in the up-down direction, and are mounted on the respective right and left end portions of the backrest 26. The lateral frame 43 connects the pair of vertical frames 42.

The lateral frame 43 projects further rearward than the vertical frame 42; that is, toward the SB middle frame 30, such that the lateral frame 43 defines a substantially C-shape in a top view. On the upper lateral frame 43U, a pair of upper rear restraining brackets 52U and a pair of wire-retaining end portions 44 are secured. Meanwhile, on the lower lateral frame 43L, a pair of lower rear restraining brackets 52L (hereinafter referred to as "rear restraining brackets 52" when discrimination between upper and lower ones is not made) and a pair of wire-retaining end portions 44 are secured.

The wire-retaining end portion 44 is a portion where a lower wire 80 (the radial wire 74), to be described later, is retained. The rear restraining bracket 52 is a portion where the rear end portion of the front-back wire 82, to be described later, is secured. The lateral wires 58 are wire strung between the pair of vertical frames 42. The lateral wires 58 support the backrest 26 from its rear side to bear the load applied from a seated person.

Figure 4:
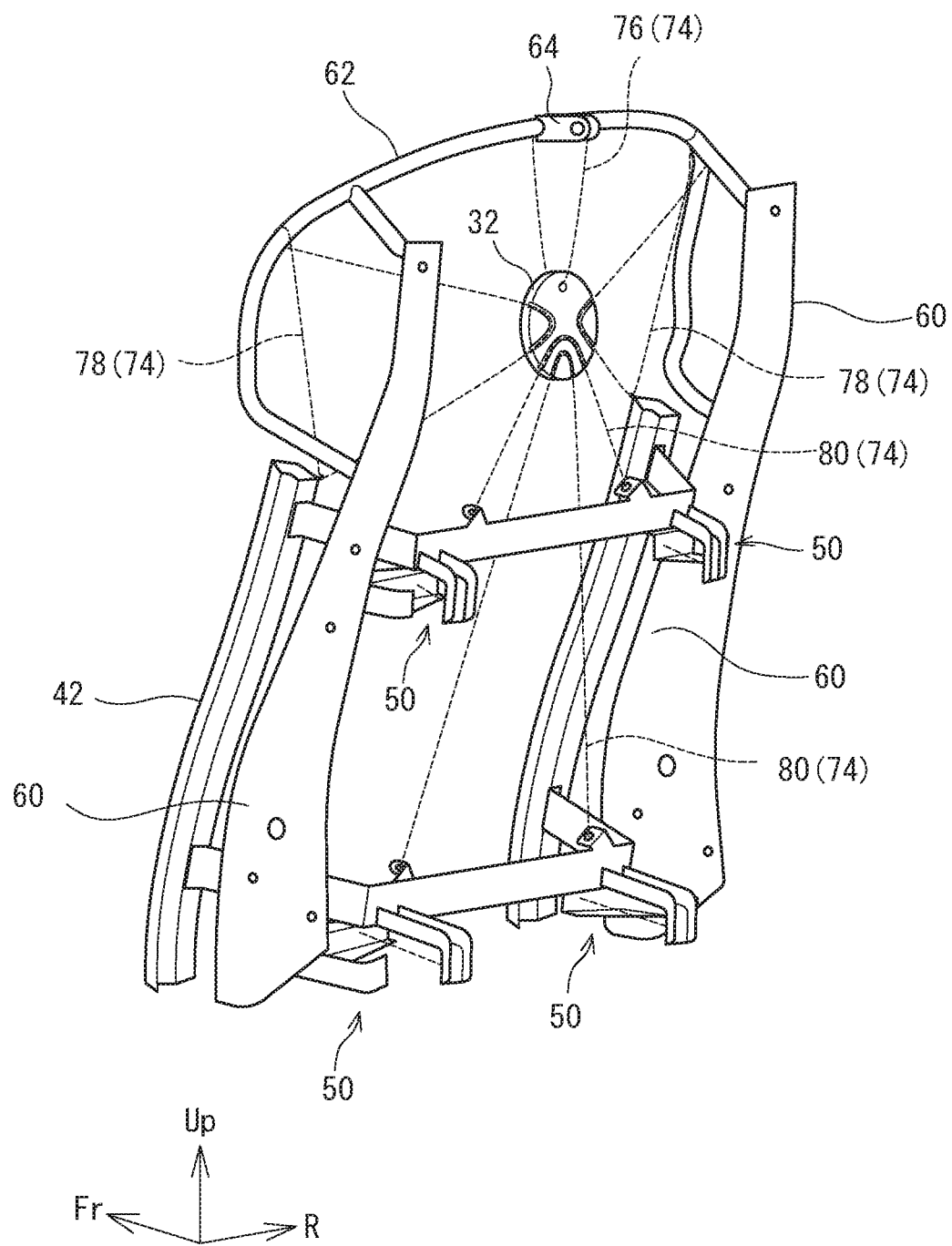
FIG. 4 illustrates wires being strung.
Figure 5:
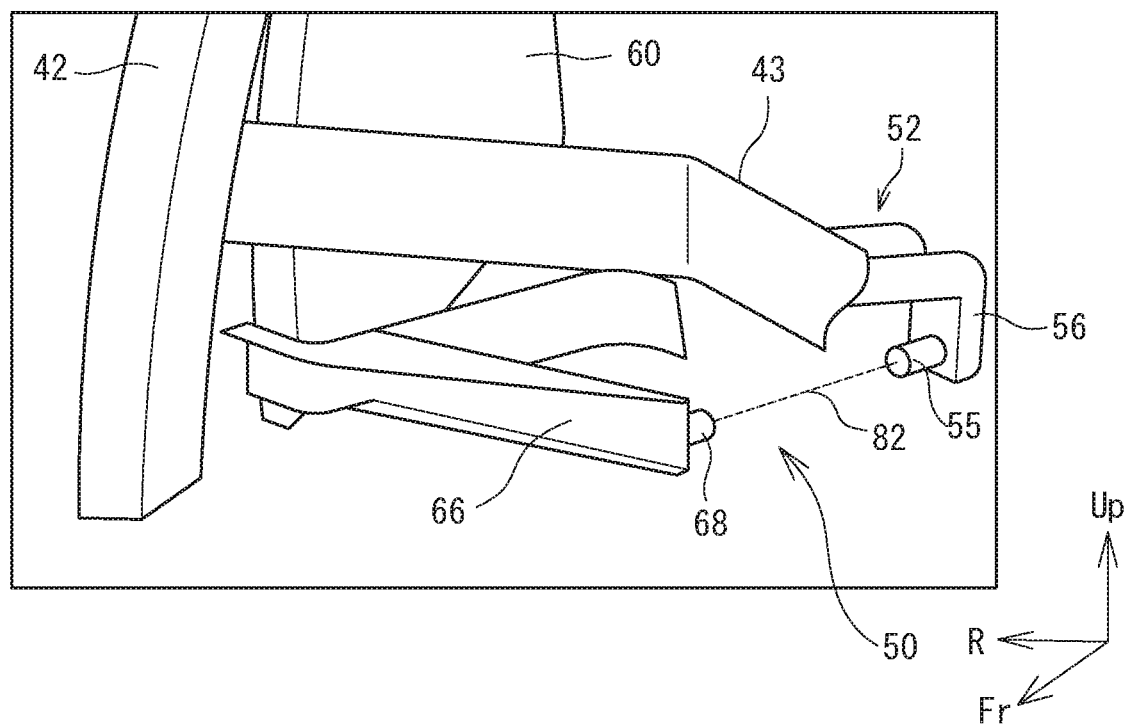
FIG. 5 is a schematic perspective view of a front-back position regulation mechanism.

Referring to FIG. 4 and FIG. 5, various manners of stringing various wires for supporting the backrest 26 or regulating the position of the backrest 26 will now be described. FIG. 4 illustrates wires strung. FIG. 5 is a perspective view of a front-back position regulation mechanism 50 and portions therearound. In FIG. 4, the backrest 26 and the lateral wires 58 are not illustrated.

As is obvious from FIG. 4, a plurality of wires extend radially from the relay disk 32. These plurality of radially extending wires will be hereinafter collectively referred to as radial wires 74. Each radial wire 74 functions as a suspension tool for holding the backrest 26 suspended. The radial wires 74 include one upper wire 76, a pair of right and left wires 78, and two lower wires 80. The upper wire 76 is a ring wire suspended from a pulley 64 and passing through a hole formed on the relay disk 32. With the upper wire 76, the relay disk 32 and thus the backrest 26 are held suspended. Note that the support pipe 62, on which the pulley 64 is mounted, is a part of the SB middle frame 30, and the position of the support pipe 62 relative to the SB main frame 22 is fixed. Being suspended from the pulley, the backrest 26 can swing relative to the SB main frame 22. Each of the lower wires 80 is a wire passing through the relay disk 32 so as to bend into a U-shape such that both its ends descend from the relay disk 32. The respective end portions of each lower wire 80 are secured to the pair of wire-retaining end portions 44 provided to the lateral frames 43.

The two right and left wires 78 are strung in a right-left symmetrical manner. Each of the right and left wires 78 is a ring wire, and is strung so as to define a substantial triangle by passing through the relay disk 32, the upper end portion of the vertical frame 42, and a portion of the support pipe 62 on the extension from the relay disk 32 in a corresponding right or left diagonally forward direction. As the two right and left wires 78 are strung in a right and left symmetrical manner, the backrest 26 is naturally positioned at a neutral position where the tensile forces of the two right and left wires 78 balance.

As described above, the positions of the relay disk 32 and the backrest 26 having the relay disk 32 secured thereon, relative to the SB middle frame 30 (and thus the SB main frame 22), are restrained by the plurality of radial wires 74. This restraint, however, is not rigid. That is, when the radial wires 74 flex or incline moderately, the backrest 26 and the SB subframe 28 mounted on the backrest 26 can swing relative to the SB main frame 22 with the relay disk 32 as the center.

In order to regulate the position in the front-back direction of the backrest 26, one or more (four in this example) front-back position regulation mechanisms 50 are provided to the vehicle-mounted seat device 10. As illustrated in FIG. 5, each front-back position regulation mechanism 50 includes a front restraining bracket 66 provided to the SB middle frame 30, the rear restraining bracket 52 provided to the SB subframe 28, and the front-back wire 82. The front restraining bracket 66 is a bracket mounted on the front end portion of the side frame 60 of the SB middle frame 30. On a part of the front restraining bracket 66, a substantially cylindrical front fixing portion 68 is mounted extending rearward. The front end portion of the front-back wire 82 is secured on the front fixing portion 68.

The rear restraining bracket 52 is a bracket to be mounted on the lateral frame 43 of the SB subframe 28. The rear restraining bracket 52 includes as main components a rear fixing portion 55, on which the rear end portion of the front-back wire 82 is secured, and an arm portion 56 extending from the rear fixing portion 55 so as to detour upward before further extending forward to be secured to the lateral frame 43. The rear fixing portion 55 is positioned behind and substantially directly opposed to the front fixing portion 68. The arm portion 56 is a substantially L-shaped member that is bent midway. At the bent portion of the arm portion 56, a weak portion where stress is more likely concentrated than other portions is formed, as will be described later.

The front-back wire 82 is a wire whose front end portion is secured to the front fixing portion 68 and whose rear end portion is secured to the rear fixing portion 55. This strung front-back wire 82 regulates the rearward movement of the backrest 26 and the SB subframe 28. That is, the front-back wire 82 functions as a restraining member for regulating the rearward movement of the SB subframe 28 relative to the SB main frame 22.

With the vehicle-mounted seat device 10 having the above-described structure, the backrest 26 can swing relative to the SB main frame 22 around the front-back axis. In this case, rightward and leftward swings caused when a vehicle is running can be absorbed not by the motion of the head of a seated person but by the motion of a body, which can stabilize the posture of the head of the seated person. Moreover, as the backrest 26, on which the back of a seated person is to lean, is supported by a plurality of wires, it is possible to provide suitable cushioning even without a thick cushion member (for example, a urethane seat), which enables reduction in weight of the vehicle-mounted seat device 10.

Note here that a seated person may suffer cervical strain; that is, so-called whiplash, at the time of rear collision of a vehicle, depending on the structure of the vehicle-mounted seat device 10. Specifically, whiplash is a disorder caused when the body is pushed forward by the seatback 14 while the head remains as it is at the time of rear collision, and consequently, the head swings far rearward relative to the body, whereby the cervical vertebrae, which support the head, are damaged. In a structure in which the backrest 26 is supported with wires, in particular, the body of a seated person sinks rearward only by an amount within the range permitted by the tensile force of the wires. Consequently, the head of the seated person tends to swing far relative to his/her body in the case of a structure in which the backrest 26 is supported with wires, as compared with a structure including a thick cushion member.

To address the above, in this specification, a headrest 16 is caused to lean forward and the backrest 26 is caused to sink far rearward at the time of rear collision in order to prevent occurrence of or reduce the damage caused by whiplash. This will be described below in detail.

As described above and illustrated in FIG. 2, the pair of headrest stays 96 extend from the lower end of the headrest 16. Each headrest stay 96 is a metal bar member. The lower end portion of each headrest stay 96 is bent forward, as illustrated in FIG. 2. On the middle portion of the headrest stay 96, a shaft hole is formed for insertion of a rotation shaft 90 therethrough. As illustrated in FIG. 1, the headrest stay 96 extends in the right-left direction, and is secured on the SB main frame 22. The headrest stay 96 is securely mounted on the SB main frame 22 so as to rotate via the rotation shaft 90 passing through the shaft hole.

Figure 6:
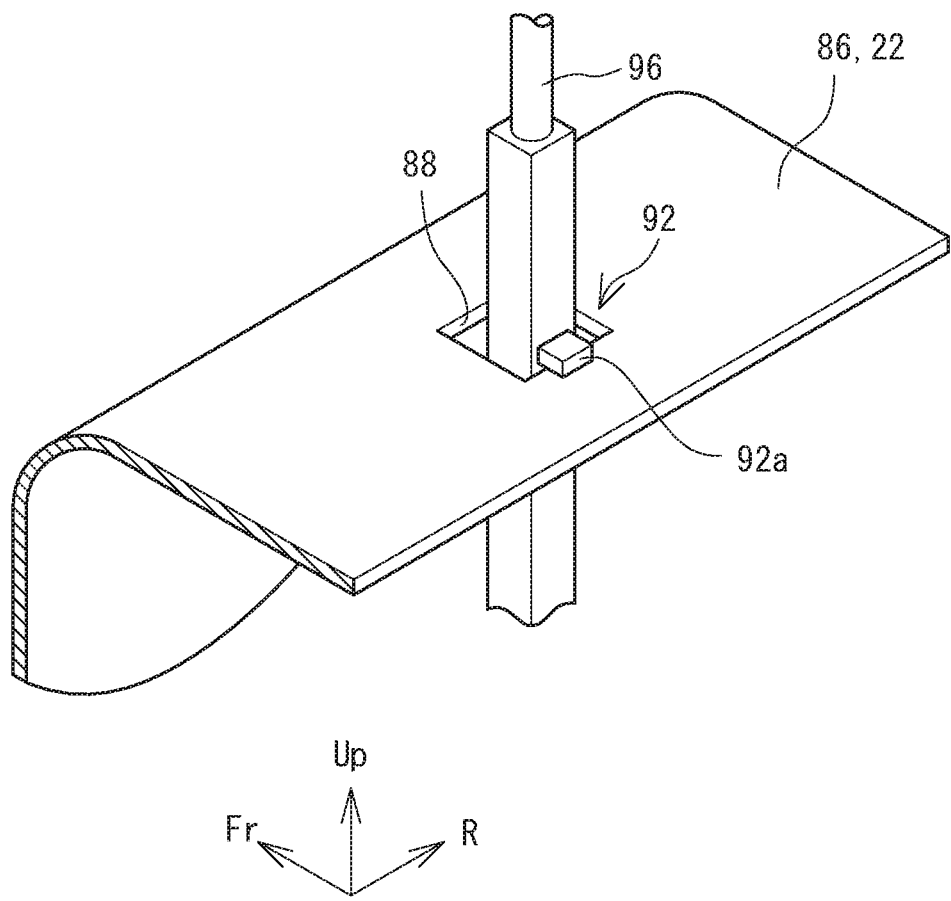
FIG. 6 is a schematic perspective view of a stay hole and a portion therearound.

On the top surface 86 of the SB main frame 22, a stay hole 88 is formed for insertion of the headrest stay 96. FIG. 6 is a schematic perspective view of the stay hole 88 and a portion therearound. As is obvious from FIG. 6, the stay hole 88 is sufficiently larger than the headrest stay 96 with a space left between the outer circumferential surface of the headrest stay 96 and the inner circumferential edge of the stay hole 88. To regulate the movement of the headrest stay 96 in the stay hole 88 (specifically, the rotation of the headrest stay 96 around the rotation shaft 90), the headrest 16 is provisionally connected to the SB main frame 22 by a provisional connection mechanism 92. The provisional connection mechanism 92 is a mechanism for connecting the headrest stay 96 to the SB main frame 22 to regulate the rotation of the headrest stay 96 and for releasing the connection upon input of a force greater than a predetermined force to the headrest stay 96 in a direction in which the headrest stay 96 leans forward.

In this example, the provisional connection mechanism 92 magnetically connects the headrest stay 96 to the SB main frame 22. Specifically, in this example, the headrest stay 96 is made of magnetic member, and a stationary magnet 92a is secured on the top surface 86 of the SB main frame 22 to magnetically attract the rear end surface of the headrest stay 96. Upon application of a force greater than a predetermined force, the headrest stay 96 leans forward against the magnetic attracting force. Note that the above-mentioned structure of the provisional connection mechanism 92 is only an example, and can be arbitrarily modified. For example, the stationary magnet 92a may be secured on the headrest stay 96, rather than on the SB main frame 22, and the top surface 86 of the SB main frame 22 may be made of magnetic material. Still alternatively, magnets may be provided to both the headrest stay 96 and the SB main frame 22.

Figure 7A:
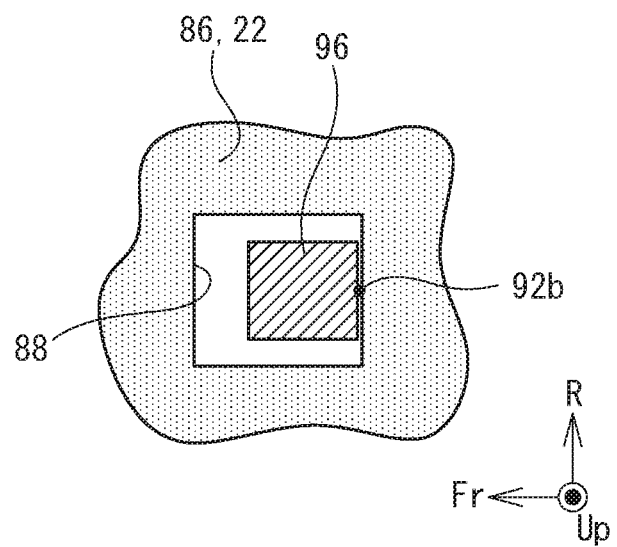
FIG. 7A is a plan view of an example of a provisional connection mechanism.
Figure 7B:
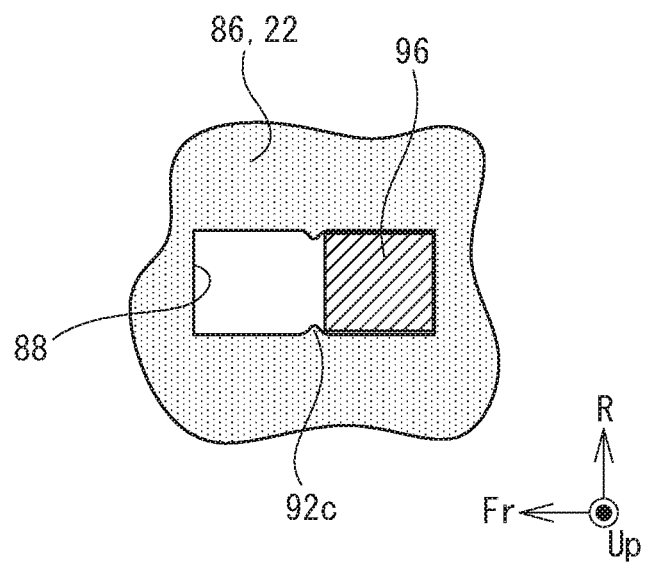
FIG. 7B is a plan view of another example of a provisional connection mechanism.
Figure 8A:
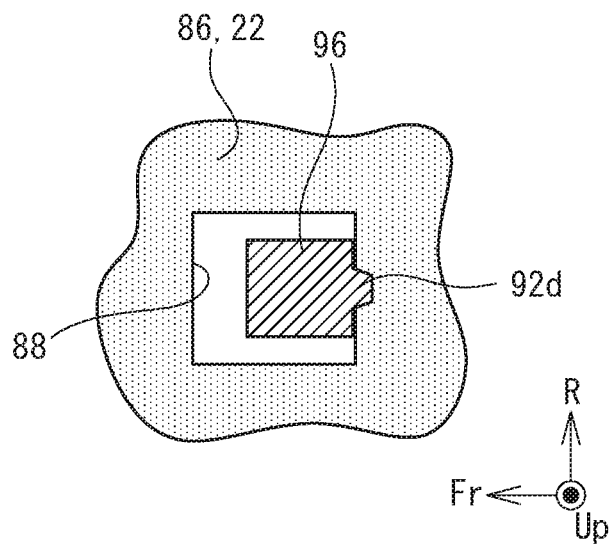
FIG. 8A is a plan view of another example of a provisional connection mechanism.
Figure 8B:
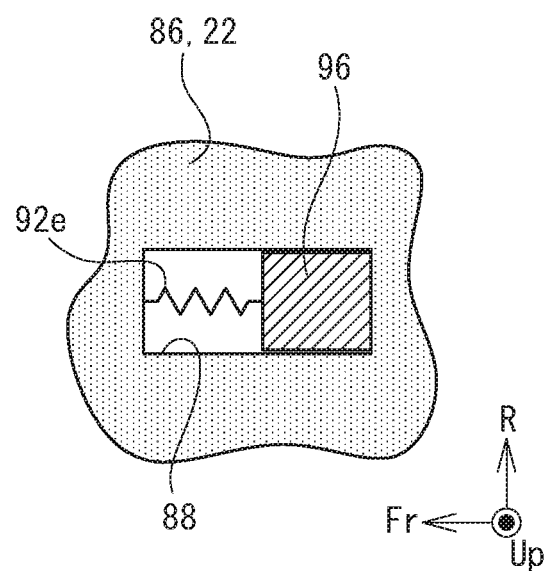
FIG. 8B is a plan view of another example of a provisional connection mechanism.

The provisional connection mechanism 92 may provisionally connect the headrest stay 96 to the SB main frame 22, using any another connector other than a magnet. For example, as illustrated in FIG. 7A, the rear end surface of the headrest stay 96 may be connected to the rear end edge of the stay hole 88 through spot welding 92b. In this case, the strength of the spot welding is such that it is broken with application of a force greater than a predetermined force. As an alternative configuration, as illustrated in FIG. 7B, the size of the stay hole 88 in the front-back direction may be sufficiently larger than that of the headrest stay 96, and a narrower portion 92c having a width slightly smaller than that of the headrest stay 96 may be formed in the intermediate portion of the stay hole 88. As a still alternative configuration, as illustrated in FIG. 8A, a fitting portion 92d may be formed on the rear end edge of the stay hole 88 and on the rear end surface of the headrest stay 96 so that the fitting portions 92d are fit to each other to thereby regulate the mutual movement by friction force. As a yet alternative configuration, as illustrated in FIG. 8B, a spring 92e may be provided to push the headrest stay 96 onto the rear end edge of the stay hole 88.

As illustrated in FIG. 2, a pressure-receiving body 98 is secured on the leading end portion of the headrest stay 96. The pressure-receiving body 98 is a plate member disposed behind and opposed to the relay disk 32. The pressure-receiving body 98 is larger in size than the relay disk 32, and is disposed near the relay disk 32.

Figure 9:
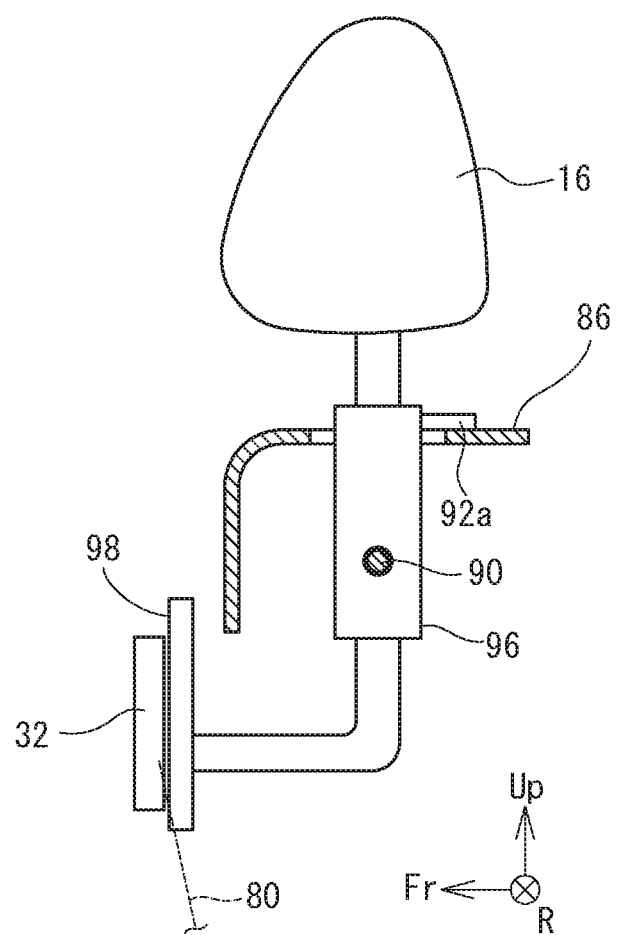
FIG. 9 is a schematic cross sectional view of a headrest stay and a portion therearound in a normal state.
Figure 10:
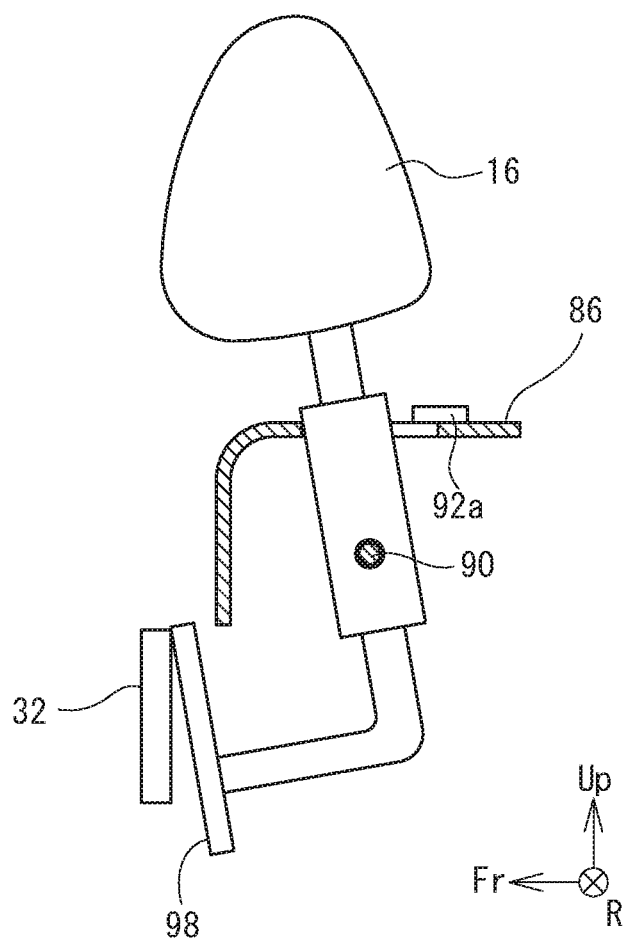
FIG. 10 is a schematic cross sectional view of a headrest stay and a portion therearound at a rear collision.

The movement of the headrest stay 96 having the above-described structure will now be described while referring to FIG. 9 and FIG. 10. FIG. 9 and FIG. 10 are schematic cross sectional views of the headrest stay 96 and portions therearound. In particular, FIG. 9 relates to a normal state, and FIG. 10 relates to the time of rear collision. As illustrated in FIG. 9, in a normal state, the headrest stay 96 remains provisionally connected to the top surface 86 of the SB main frame 22 with the stationary magnet 92a. The pressure-receiving body 98 is disposed behind and opposed to the relay disk 32 with a slight space left therebetween. Note that as the backrest 26 swings with the relay disk 32 as the center, the position of the relay disk 32 relative to the SB main frame 22 and thus the pressure-receiving body 98 remains unchanged even if the backrest 26 should swing. That is, the relay disk 32 always remains opposed to the pressure receiving body 98.

In contrast, at the time of rear collision, the vehicle-mounted seat device 10 moves forward together with the vehicle body. Then, the body of a seated person sinks rearward together with the backrest 26 by an amount in the range permitted by the tensile force of the radial wires 74 and the lateral wires 58. Consequently, as illustrated in FIG. 10, the relay disk 32, secured on the backrest 26, collides against the pressure-receiving body 98. Due to the collision, the pressure-receiving body 98 as well moves rearward, whereby the headrest stay 96 rotates with the rotation shaft 90 as the center so as to lean forward. This causes the headrest 16 to move forward to thereby restrain the rearward movement of the head portion. Consequently, the amount of rearward swing of the head relative to the body is reduced. This can effectively prevent occurrence of or reduce the damage of whiplash.

Figure 11:
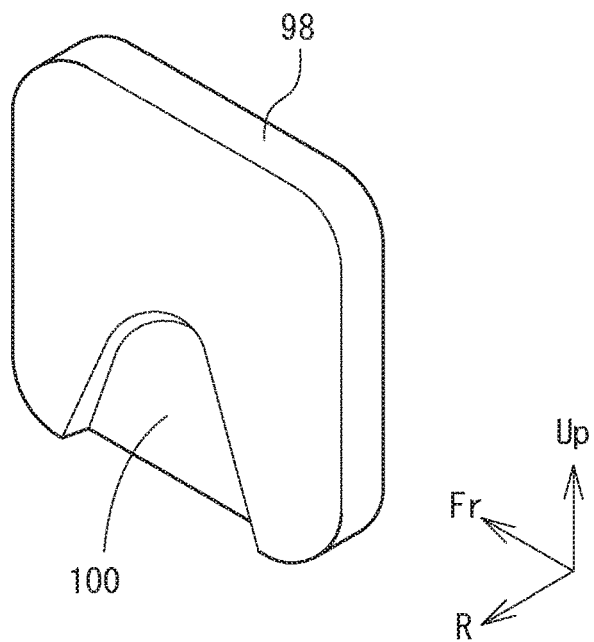
FIG. 11 is a perspective view of a pressure-receiving body.

As described above and illustrated in FIG. 9, each of the lower wires 80 extends diagonally rearward and downward from the relay disk 32. When the pressure-receiving body 98 is disposed behind and opposed to the relay disk 32, the lower wire 80 may possibly interfere with the pressure-receiving body 98. In view of the above, as illustrated in FIG. 11, a recess 100 may be formed on the surface of the pressure-receiving body 98 that is opposed to the relay disk 32 to thereby avoid interference with the lower wire 80. In addition, the height of the position where the backrest 26 is disposed can be changed depending on the body-build of a seated person. In this case, the pressure-receiving body 98 may have a sufficiently large size, as compared with the relay disk 32; that is, large enough for the pressure-receiving body 98 to remain directly opposed to the relay disk 32 should the height of the relay disk 32 be changed following change in height of the backrest 26.

Although in the above description the pressure-receiving body 98 is a plate member, the pressure-receiving body 98 may have any other shape and structure without limitation, provided that the relay disk 32 can collide against the pressure-receiving body 98. For example, the pressure-receiving body 98 may be a bar member straddling between the leading end portions of the pair of headrest stays 96. Alternatively, the pressure-receiving body 98 may be either a separate member from the headrest stay 96 or a part of the headrest stay 96. That is, the tip end portion of the headrest stay 96 may be used as the pressure-receiving body 98. Still alternatively, the headrest stay 96 may be made from a single member or a combination of a plurality of members.

Figure 12:
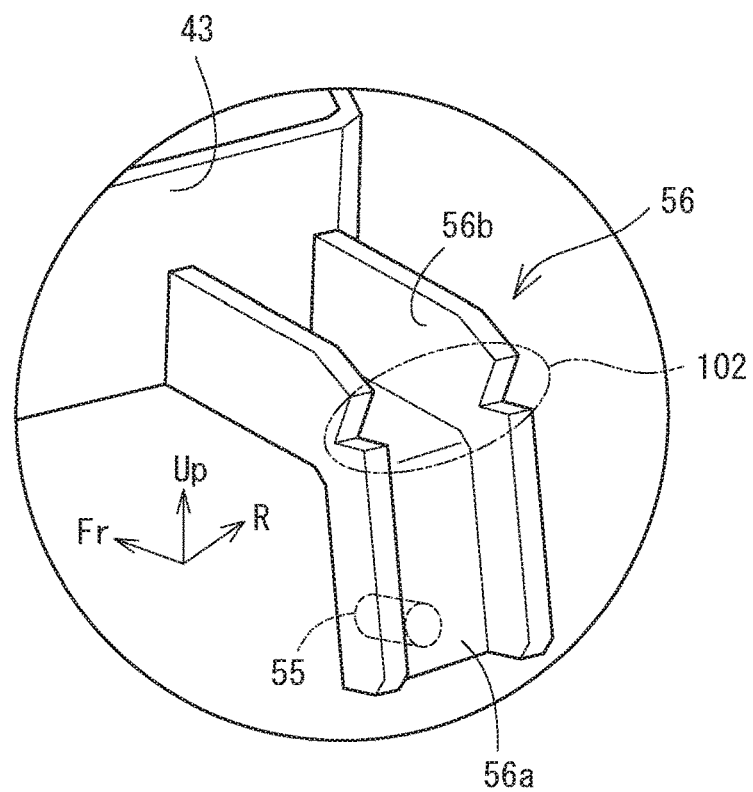
FIG. 12 is a perspective view of a rear restraining bracket.

The front-back position regulation mechanism 50 in this example will now be described in detail. As described above, the front-back position regulation mechanism 50 includes the rear restraining bracket 52 to be secured relative to the SB subframe 28, the front restraining bracket 66 to be secured relative to the SB main frame 22, and the front-back wire 82 strung between the respective restraining brackets 52, 66. FIG. 12 is a perspective view of the rear restraining bracket 52. As described above and illustrated in FIG. 12, the rear restraining bracket 52 includes the substantially L-shaped arm portion 56 and the rear fixing portion 55 provided to the leading end portion of the arm portion 56. Further, the arm portion 56 includes a thin panel main portion 56a, and a railing portion 56b standing from the respective sides of the main portion 56a. Provision of the railing portion 56b enhances the strength of the arm portion 56. The rear fixing portion 55 is a substantially cylindrical member mounted on an end portion of the arm portion 56. Alternatively, the rear end portion of the front-back wire 82 may be secured directly to an end portion of the arm portion 56 without providing such a cylindrical member. In this case, the end portion of the arm portion 56 functions as the rear fixing portion 55.

In this example, a weak portion 102 is formed at the bent portion of the arm portion 56. The weak portion 102 is a portion where stress is likely concentrated when a compressing force is applied in the front-back direction. In this example, as illustrated in FIG. 12, a notch is formed on the railing portion 56b at the bent portion to thereby constitute the weak portion 102. The weak portion 102 may have a different structure. For example, the main portion 56a at the bent portion may be thinner than other portions, or a notch may be formed in the main portion 56a at the bent portion, to thereby constitute the weak portion 102.

Figure 13:
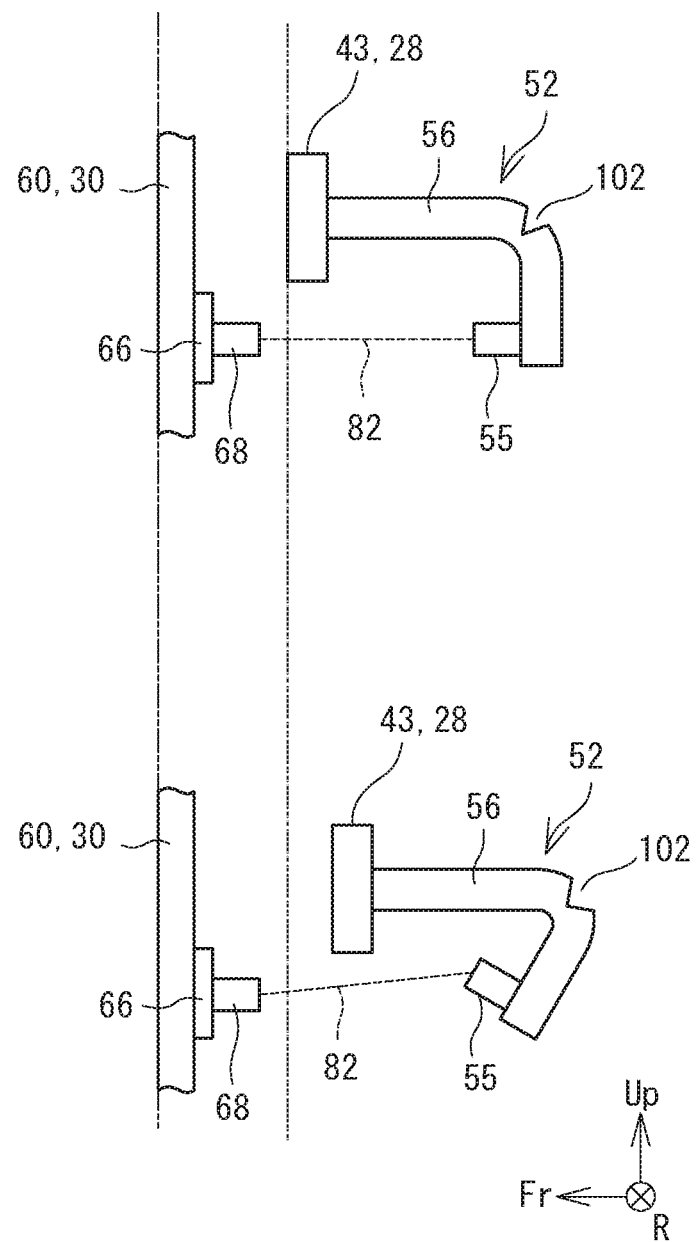
FIG. 13 is a schematic side view of a front-back position regulation mechanism.

The movement of the front-back position regulation mechanism 50 having the above-described structure will now be described while referring to FIG. 13. FIG. 13 is a schematic side view of the front-back position regulation mechanism 50. The upper illustration in FIG. 13 relates to a normal state, while the lower illustration relates to the time of rear collision. As shown in the upper illustration in FIG. 13, in a normal state, the front fixing portion 68 is directly opposed to the rear fixing portion 55, and the front-back wire 82 is strung between the respective fixing portions 68, 55. The SB subframe 28 including the lateral frame 43 is regulated by the front-back wire 82 so as not to move rearward by an amount in excess of a predetermined amount.

At the time of rear collision, the SB main frame 22 moves forward together with the vehicle body, while a seated person remains where he/she is. In other words, the seated person moves relatively rearward relative to the SB main frame 22. The backrest 26 and the SB subframe 28 as well, which support the seated person, move rearward relative to the SB main frame 22. In the case where the rear restraining bracket 52 is sufficiently rigid, however, the relative rearward movement of the SB subframe 28 is regulated by the front-back wire 82, and the body of the seated person does not sink sufficiently. In this case, only the head of the seated person moves rearward relative to the body, which likely causes whiplash.

In this example, the weak portion 102 is provided to the arm portion 56 of the rear restraining bracket 52, as described above. Consequently, when the SB subframe 28 moves rearward relative to the SB main frame 22 and a load is thereby applied to the arm portion 56, stress will be concentrated on the weak portion 102. Thus, the weak portion 102 bends, as shown in the lower illustrated in FIG. 13; the arm portion 56 thereby bends into a V-shape; and the rear fixing portion 55 is displaced forward relative to the leading end portion of the arm portion 56. In this case, the SB subframe 28 is allowed to move rearward relative to the SB main frame 22 by an amount corresponding to an amount by which the rear fixing portion 55 is displaced forward. This resultantly increases the amount by which the body of a seated person sinks at the time of rear collision. The increase in the amount by which the body of a seated person sinks and the readiness with which the body moves together with the head can accordingly effectively prevent occurrence of or reduce the damage of whiplash. Note that as the buckling load of the weak portion 102 is smaller than a load which the front-back wire 82 can tolerate against tension, or a maximum tensile load, the weak portion 102 is bent and deformed before the front-back wire 82 is broken by tension. This prevents the body of a seated person from limitlessly moving rearward at the time of rear collision.

Figure 14:
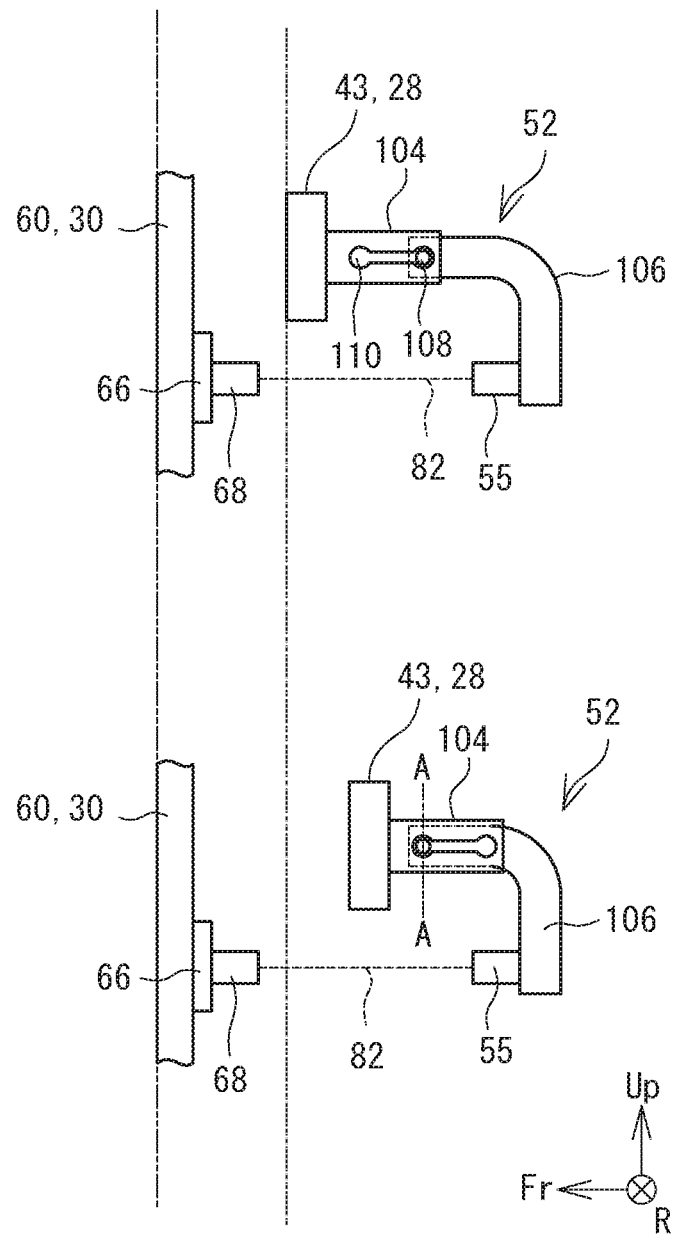
FIG. 14 is a schematic side view of another example of a front-back position regulation mechanism.

In this example, provision of the weak portion 102 in the arm portion 56 induces deformation of the arm portion 56. The arm portion 56, however, may have a different structure, provided that the structure causes the rear fixing portion 55 to move forward relative to the front end portion of the arm portion 56 to be thereby deformed upon input of a rearward load greater than a predetermined load. For example, as illustrated in FIG. 14, the arm portion 56 may include a reference portion 104 secured relative to the SB subframe 28 and a movable portion 106 extending rearward from the rear end of the reference portion 104. In this case, the movable portion 106 is slidable relative to the reference portion 104.

Figure 15:
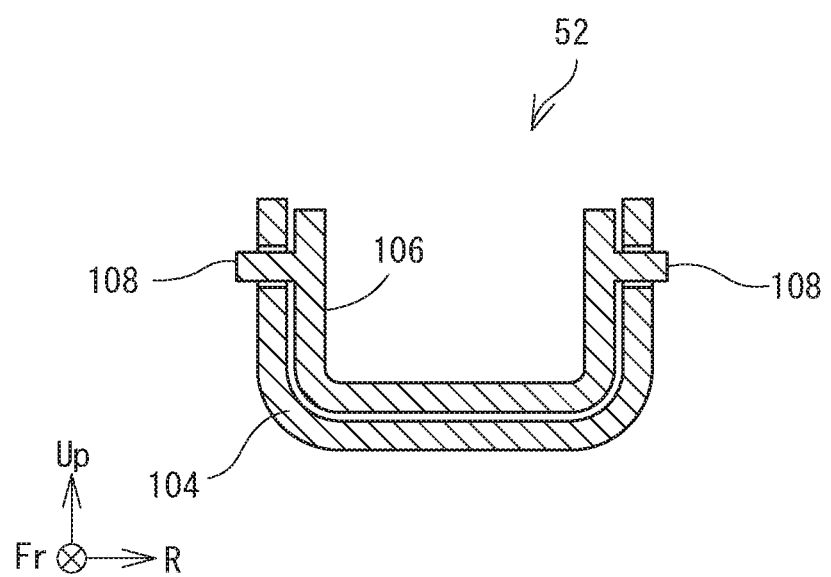
FIG. 15 is a schematic cross sectional view along line A-A in FIG. 14.

FIG. 15 is a schematic cross sectional view along line A-A in FIG. 14. As illustrated in FIG. 15, each of the reference portion 104 and the movable portion 106 has a substantially C shape that is open upward. The movable portion 106 is smaller than the reference portion 104 and disposed inside the reference portion 104. Guide shafts 108 extend from respective side surfaces of the movable portion 106. As illustrated in FIG. 14, a guide slit 110 is formed on each of the side surfaces of the reference portion 104 so at to extend in the front-back direction for insertion of the guide shaft 108 therein. Only the front and rear end portions of the guide slit 110 are large, and the middle portion of the guide slit 110 is slightly smaller than the outer diameter of the guide shaft 108. Thus, the guide shaft 108 remains in the rear end portion of the guide slit 110 when no large load is applied, as shown in the upper illustration in FIG. 14.

Meanwhile, when a rearward force greater than a predetermined force is inputted into the arm portion 56 at the time of rear collision, as shown in the lower illustration in FIG. 14, the guide shaft 108 overcomes the narrower portion of the guide slit 110 to move to the front end portion of the guide slit 110. In the above, the movable portion 106 as well, connected to the guide shaft 108, moves forward relative to the reference portion 104. Consequently, the rear fixing portion 55 moves forward relative to the front end portion of the arm portion 56. This movement increases the amount by which the backrest 26 can sink, which prevents occurrence of and reduces the damage of whiplash.

Note that in this example there are provided four front-back position regulation mechanisms 50; namely, two around the height of the chest of a seated person and two around the height of the hips. The four front-back position regulation mechanisms 50 may all have the same structure or different structures. For example, the structures of the front-back position regulation mechanisms 50 may be different from one another such that the front-back position regulation mechanism 50 provided around the height of the hips starts deforming earlier and deforms to a greater extent than the front-back position regulation mechanism 50 provided around the height of the chest. This will be described below while referring to FIG. 16.

Figure 16:
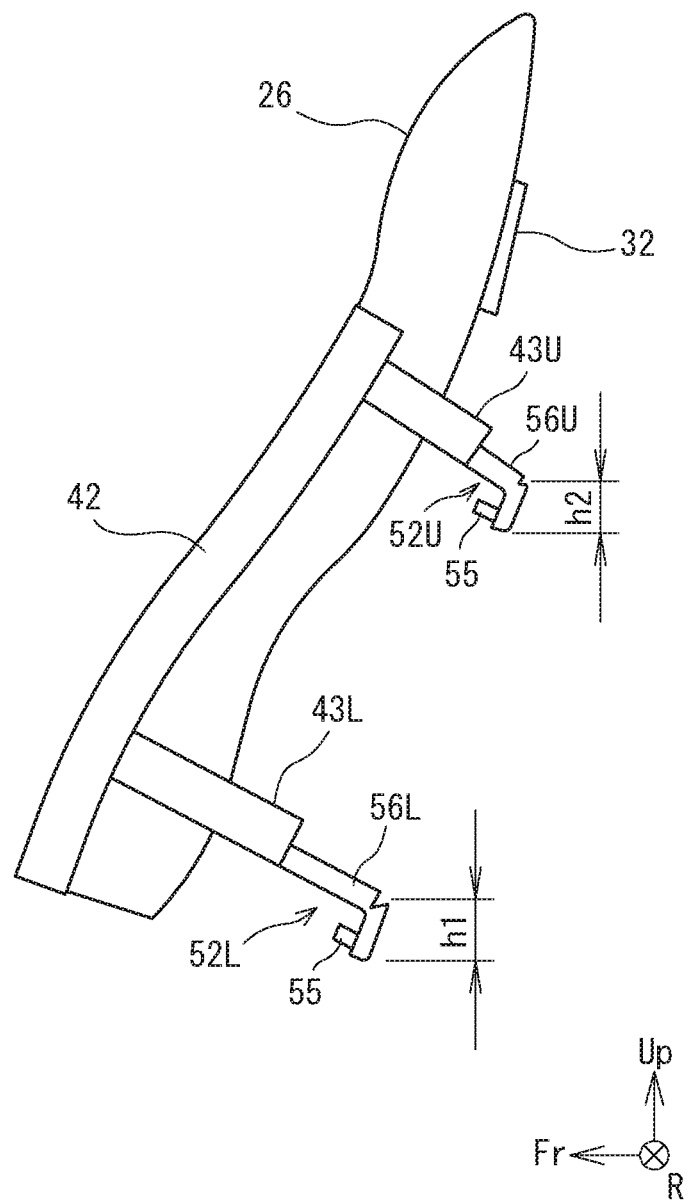
FIG. 16 is a schematic side view of a backrest and an SB subframe.

FIG. 16 is a schematic side view of the backrest 26 and the SB subframe 28. When a large distance is ensured for the hips of a seated person to sink at the time of rear collision, impacts at collision can be absorbed. This enables more reliable prevention of occurrence of whiplash. In addition, when the hips are retreated further than the chest to thereby have the body of the seating person further upright, it is possible to extract maximum capability of a seatbelt and an airbag. In this view, in order to increase the amount of sinking of the hips and portions therearound, the upper rear restraining brackets 52U and the lower rear restraining brackets 52L may have different structures.

Specifically, the arm portion 56 of the lower rear restraining bracket 52L (hereinafter referred to as a "lower arm portion 56L") may be configured so as to start deforming upon input of a small load, as compared with the arm portion 56 of the upper rear restraining bracket 52U (hereinafter referred to as an "upper arm portion 56U"). In the case where each arm portion 56 has such a structure as is illustrated in FIG. 13, this is achievable by forming a larger notch on the weak portion 102 of the lower arm portion 56L than that on the weak portion 102 of the upper arm portion 56U. As an alternative configuration, the lower arm portion 56L may be made from material less rigid than that of the upper arm portion 56U. Further, in the case where each arm portion 56 has such a structure as is illustrated in FIG. 14, the lower arm portion 56L may be configured so as to start deforming at earlier timing than the upper arm portion 56U, by adjusting the amount by which the middle portion of the guide slit 110 is narrowed.

Still alternatively, the lower arm portion 56L may be configured so as to be deformed to a greater extent at the time of rear collision than the upper arm portion 56U. In the case where each arm portion 56 has such a structure as illustrated in FIG. 13, this is achievable by making the height h1 of the lower arm portion 56L higher than the height h2 of the upper arm portion 56U. In addition, in the case where each arm portion 56 has such a structure as is illustrated in FIG. 14, the guide slit 110 of the lower arm portion 56L may be longer than the guide slit 110 of the upper arm portion 56U.

By setting different amounts of deformation and different values of load which causes the arm portion 56 to start deformation, depending on the height where the arm portion 56 is disposed, as described above, it is possible to reliably prevent occurrence of whiplash. In addition, as such different settings make it possible to have the body of a seated person further upright at the time of rear collision, it is possible to enhance the effect of a seatbelt or an airbag, which enables further appropriate protection of a seated person.

Note that the above-described structure is a mere example, and there may be employed structures other than a structure in which the pressure-receiving body 98 for receiving an input of a load to cause the headrest 16 to lean forward is disposed behind and opposed to the relay disk 32, or the center of swing of the backrest 26, and the headrest stay 96 is provisionally connected to the SB main frame 22. For example, although in the above description the rear restraining bracket 52 has the weak portion 102, the weak portion 102 is omissible. Further, although in the above description the backrest 26 is held suspended from the SB main frame 22 via the SB middle frame 30, the SB middle frame 30 may be omitted and the backrest 26 may be suspended directly from the SB main frame 22. Still further, although a wire is mentioned as an example of a suspension tool for suspending the backrest 26, the suspension tool may comprise any members, such as, for example, linear members, such as ropes, strings, or climbing ropes, wide band members, chains including connected rings, and so forth, other than wires.

REFERENCE SIGNS LIST 10 vehicle-mounted seat device, 12 seat cushion, 14 seatback, 16 headrest, 18 slide rail, 20 reclining shaft, 22 SB main frame, 24 SB assembly, 26 backrest, 28 SB subframe, 30 SB middle frame, 32 relay disk, 36 wire guide, 42 vertical frame, 43 lateral frame, 44 wire-retaining end portion, 50 front-back position regulation mechanism, 52 rear restraining bracket, 55 rear fixing portion, 56 arm portion, 58 lateral wire, 60 side frame, 62 support pipe, 64 pulley, 66 front restraining bracket, 68 front fixing portion, 74 radial wire, 76 upper wire, 78 right and left wires, 80 lower wire, 82 front-back wire, 88 stay hole, 90 rotation shaft, 92 provisional connection mechanism, 92a stationary magnet, 92b spot welding, 92c narrower portion, 92d fitting portion, 92e spring, 96 headrest stay, 98 pressure-receiving body, 100 recess, 102 weak portion, 104 reference portion, 106 movable portion, 108 guide shaft, 110 guide slit.

The invention claimed is:

1. A vehicle-mounted seat device, comprising;
a seatback main frame standing in a vehicle cabin;

a backrest on which a back of a seated person is to lean;

a relay disk secured at a center in a width direction of the backrest;

a plurality of suspension tools spreading radially from the relay disk as a center, the suspension tools being for suspending the backrest such that the backrest is able to swing relative to the seatback main frame with the relay disk as a center;

a seatback subframe mounted on the backrest, the seatback subframe being capable of swinging together with the backrest relative to the seatback main frame;

a headrest provided above the backrest, the headrest for supporting a head of the seated person;

a headrest stay connected to the headrest and extending downward from the headrest;

a rotation shaft extending in a right-left direction, the rotation shaft for supporting a middle portion of the headrest stay such that the headrest stay is able to rotate relative to the seatback main frame;

a pressure-receiving body secured on a lower portion of the headrest stay and disposed behind and opposed to the relay disk; and a provisional connection mechanism for connecting the headrest stay to the seatback main frame to regulate rotation of the headrest stay and for releasing connection between the headrest stay and the seatback main frame upon input of a force greater than a predetermined force in a direction in which the headrest stay leans forward.

2. The vehicle-mounted seat device according to claim 1, wherein the provisional connection mechanism connects the headrest stay to the seatback main frame by any of magnetic force, friction force, and a member that is breakable upon input of a force greater than a predetermined force.

3. The vehicle-mounted seat device according to claim 1, wherein the seatback main frame has a stay hole that is a through hole into which the headrest stay is to be inserted and that is larger than the headrest stay.

4. The vehicle-mounted seat device according to claim 1, wherein the pressure-receiving body is a plate equal to or larger in size than the relay disk, and the pressure-receiving body has a recess formed on a surface thereof opposed to the relay disk, the recess for avoiding interference with the suspension tool extending from the relay disk.

* * * * *